C. E. WEAVER.
CLAMPING STEM FOR BICYCLE HANDLE BARS.
APPLICATION FILED MAY 8, 1920.
1,364,496.
Patented Jan. 4, 1921.
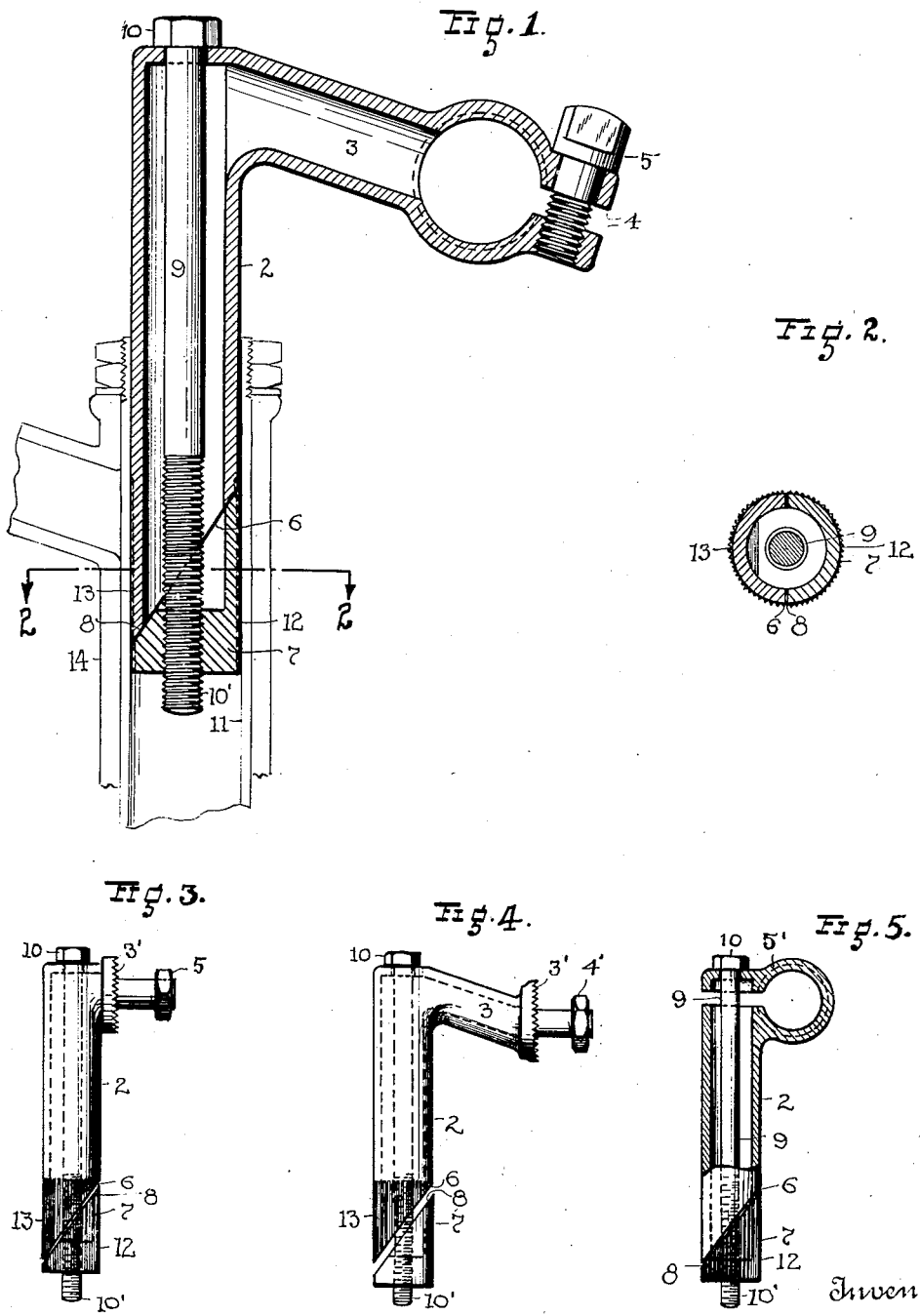

UNITED STATES PATENT OFFICE.

CHARLES E. WEAVER, OF CLEVELAND, OHIO, ASSIGNOR TO THE AMERICAN STOVE COMPANY, OF ST. LOUIS, MISSOURI, A CORPORATION.

CLAMPING-STEM FOR BICYCLE HANDLE-BARS.

1,364,496.     Specification of Letters Patent.    Patented Jan. 4, 1921.

Application filed May 8, 1920. Serial No. 379,724.

*To all whom it may concern:*

Be it known that I, CHARLES E. WEAVER, a citizen of the United States, residing at Cleveland, in the county of Cuyahoga and State of Ohio, have invented certain new and useful Improvements in Clamping-Stems for Bicycle Handle-Bars, of which the following is a specification.

My invention pertains to an improvement in a clamping stem for bicycle handle bars, and the object of the improvement is to provide a stem with an expanding shoe, and to construct these parts in a particular way to prevent them from slipping or turning when wedged within the tubular steering post of a bicycle.

In the drawing accompanying this application, Figure 1 is a vertical sectional view of my improved stem shown in a wedged position within the head portion of a bicycle. Fig. 2 is a cross section on line 2—2, Fig. 1. Fig. 3 is a side view on a reduced scale of my improved stem. Figs. 4 and 5 are side and sectional views of slightly modified forms of the invention.

The invention comprises a hollow tube or stem 2 having a suitable device at its upper end for fastening or clamping either a one or two piece handle bar to the stem. In Fig. 1 I show an extension 3 with a split clamping extremity 4 and a screw 5 to fasten a handle bar to the stem, and in Figs. 3 and 4 I show a serrated head 3' and a nut, and in Fig. 5 the upper end of the stem has a split head 5' which may be closed by bolt 9. The lower end of the stem is beveled on a straight line to provide a flat surface 6 extending obliquely to the vertical axis of the stem, and a sliding shoe 7 of the same diameter as the stem has a corresponding beveled flat face or surface 8 whereby the said shoe may be seated and used as a straight extension or prolongation of the stem. The clamping bolt or screw 9 serves to hold the shoe and stem together and a hexagonal head or enlargement 10 on the screw bears and rests upon the upper end of the stem and provides an exposed wrench-engaging portion wherewith to turn the screw. The screw-threaded extremity 10' of this bolt or screw passes through the solid end of shoe 7, and when the screw is rotated the shoe cannot turn independently of the stem if the flat engaging faces 6 and 8 are in contact; the result is that the shoe and stem are pressed out of axial alinement when the stem and shoe rest within the tubular steering post or fork 11 of the bicycle. The effect of this misalinement of the shoe and stem is to crowd and wedge the longer face 12 of the shoe and the exterior vertical face 13 of the stem against the opposite sides or interior walls of the post 11, thereby locking the stem and post rigidly together.

With a smooth stem and shoe I find that locking of the stem within the post is not effective to the degree required to prevent the stem from turning independently of the post under heavy strain or stress on the handle bar. Of course, the locking of the stem within the post might be made effective providing screw 9 was turned a sufficient number of times to spread the wedge and stem to an exceptional degree, but when this extreme or excess action takes place several things are likely to happen: to wit, the tubular post 11 is apt to swell or expand, it may be injured or ruptured, or it may be caused to bind within the tubular bicycle head 14, or the screw threads on the shoe or screw may strip. To avoid such troubles and to obtain an effective lock against the turning or slipping of the stem within the steering post 11 I have serrated or corrugated the external surface of the shoe 7 and these corrugations extend longitudinally the full length of the shoe, and I may use one or more exterior serrations diametrically opposite the beveled portion or the serrations may be placed annularly opposite the beveled portion. To make the lock more effective I may also corrugate the lower extremity of stem 2, see Fig. 3. In Fig. 4 I show the lower extremity of stem 2 as serrated or corrugated longitudinally, particularly in the annular surface directly opposite the inclined wedging face 6, and in this view the shoe is shown as plain or smooth. In Fig. 5 I show the lower extremity of stem 2 as plain or smooth, and shoe 7 is serrated or corrugated longitudinally. The serrations or corrugations are preferably in the form of sharp ridges or teeth and with their use the stem 2 may be locked against turning and slipping without endangering or injuring the steering tube or post. In this connection it should be understood that persons without mechanical sense or judgment, children for example, are apt to apply a large wrench to the screw and turn it to excess, especially if they find that the stem 2 can still be turned or rotated within the post and which is possible where the stem and shoe have a smooth outer surface.

What I claim is:

1. A clamping stem for bicycle handle bars, having a beveled extremity and a separate beveled shoe united in slidable engaging connection, one of said parts being serrated upon its exterior opposite its beveled portion.

2. A clamping stem for bicycle handle bars, having a beveled extremity, a beveled shoe, a tightening screw uniting said parts, and the shoe being serrated upon its exterior opposite its beveled portion.

3. A clamping stem for bicycle handle bars, having a beveled extremity, a beveled shoe, a tightening screw uniting said stem and screw, and said stem and shoe having their exterior surfaces serrated opposite their respective beveled portions.

Signed at Los Angeles, in the county of Los Angeles, and State of California, this 21st day of April, 1920.

CHARLES E. WEAVER.